F. LEMING.
ADJUSTABLE DUST CAP FOR VALVE STEMS.
APPLICATION FILED OCT. 8, 1919.

1,329,126.

Patented Jan. 27, 1920.

INVENTOR:
Frank Leming
by Macleod, Calver, Copeland & Dike
Attys

UNITED STATES PATENT OFFICE.

FRANK LEMING, OF HINGHAM, MASSACHUSETTS.

ADJUSTABLE DUST-CAP FOR VALVE-STEMS.

1,329,126.

Specification of Letters Patent.  Patented Jan. 27, 1920.

Application filed October 8, 1919. Serial No. 329,236.

*To all whom it may concern:*

Be it known that I, FRANK LEMING, a citizen of the United States, residing at Hingham, county of Plymouth, State of Massachusetts, have invented a certain new and useful Improvement in Adjustable Dust-Caps for Valve-Stems, of which the following is a specification, reference being had therein to the accompanying drawings.

The object of the invention is to provide a quick adjustable dust cap for a valve stem. It is especially intended for application to valve stems of a vehicle tire, but it is applicable to valve stems used for any other purpose.

The ordinary dust cap of a valve stem has to be screwed down from the outer end of the valve stem to the point where the cap becomes fully seated. The special object of the present invention is to provide such a construction that the cap may be slipped down over the greater portion of the length of the valve stem before making a screw-threaded engagement, and providing a tapped-out portion at the lower end so that there will then be required only a small number of turns of the cap to form a screw-threaded engagement.

The invention will be fully understood from the following description when taken in connection with the accompanying drawings, and the novel features thereof will be pointed and clearly defined in the claims at the close of this specification.

In the drawings, Figure 1 is a sectional view of a device embodying the invention attached to the valve stem of a tire.

Figure 1:
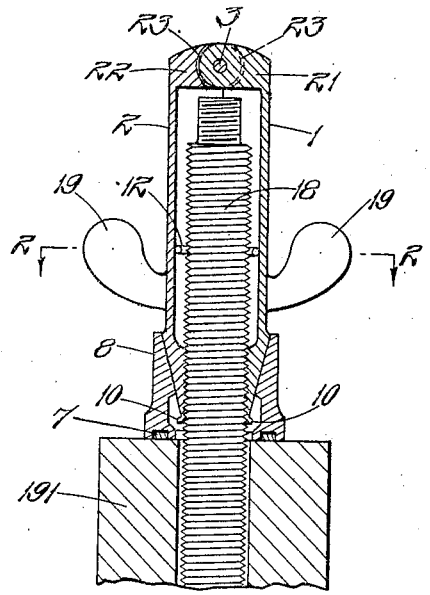

Referring now to the drawings, the dust cap proper comprises two semi-cylindrical shells 1—2, having at their outer ends respectively semi-circular portions 21—22, which when the two shells are assembled and the cap is attached to the valve stem form a closed outer end of the cap. These two semi-cylindrical shells are hinged together at their outer ends. Preferably the hinge members are on the inner side of the end portion of the cap, the hinge members consisting of lugs 23 projecting inwardly from the two shell members and hinged together by a pin 3.

The inner periphery of each of the semi-cylindrical members 1—2 is screw-threaded for some distance inward from the open ends as shown at 4—5 so that when the two semi-cylindrical members are brought together to form a tube they may be screwed down over the threaded valve stem 18, as shown in Fig. 1. The inner periphery of the two semi-cylindrical members back of the threaded portions 4—5, is of slightly larger diameter than the threaded portion so that it may slip easily over the outer portion of the valve stem. There is no need of the rearward portion being threaded.

Figure 3:
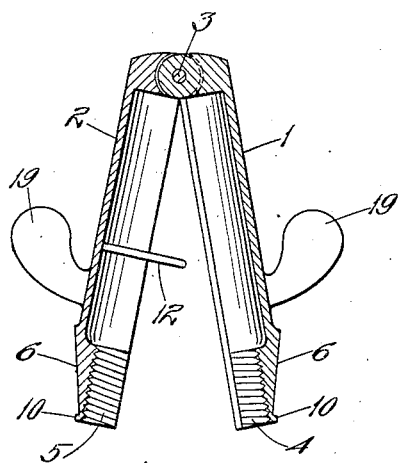
Fig. 3 is a detail view of the shell members spread apart.
Figure 4:
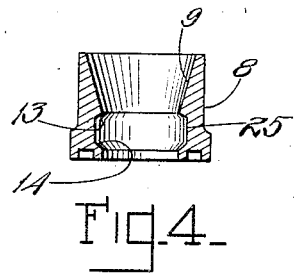
Fig. 4 is a detail view of the sleeve members.
Figure 5:
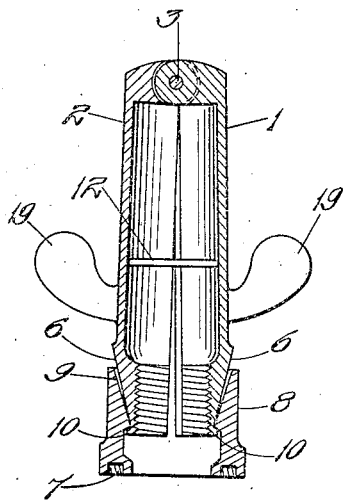
Fig. 5 is a view showing the shell members inserted in the clamping sleeve ready to be attached to a valve stem.
Figure 2:
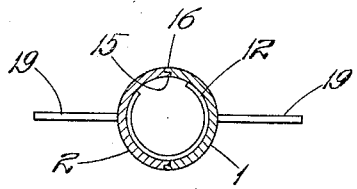
Fig. 2 is a section on line 2—2 of Fig. 1.

The outer periphery of the two semi-cylindrical members 1—2 is tapered forwardly toward the open end of the said two members as shown at 6 in Figs. 3 and 5, from a point some distance back of the end, about the same distance as the threaded interior portions 4—5.

At the open ends the shell members 1—2 are respectively formed with lips 10—10 extending laterally outward for the purpose which will be described hereinafter.

A semi-circular spring 12 is fastened at one end to the inner periphery of one of the semi-cylindrical shell members 2, the other end of the spring being free, the bowed free portion engaging with the other semi-cylindrical shell member 1 when the two members are closed, the stress of the spring tending to slightly spread apart the two shell members, but being capable of yielding to permit the two shell members to be forced into closed position.

A sleeve 8 has a tapered inner periphery 9 which fits loosely over the tapered outer periphery 6—6 of the combined semi-cylindrical members 1—2, when said members 1—2 are closed. Said sleeve is separable from the semi-cylindrical members, and is provided with a gasket 7 to make a dust-proof joint with the felly of the wheel.

The sleeve 8 is formed with a shoulder 13 some distance back from the forward end of the sleeve and is also formed with a second shoulder 14 at the forward end of the sleeve, by forward end meaning the base end or the end which is nearest the tire, leaving an annular groove 25 between the two shoulders.

When the two cylindrical members are to be engaged with the sleeve, the two shell members will be pressed closely together compressing the spring 12 so that the two members thus brought together may be inserted into the sleeve, the lips 10—10 snapping past the inner shoulder 13 of the sleeve until the lips 10—10 enter the annular groove or recess 25, (see Fig. 5), and then if the pressure upon the two shell members is relaxed, the spring 12 will slightly spread them apart as allowed by the greater diameter of the annular groove 25. The two shoulders 13 and 14 prevent the sleeve from being accidentally disengaged from the shell members.

Preferably, one of the semi-cylindrical shell members is formed with a longitudinal flange 15 on its inner periphery, said flange being shown in the drawings as formed on the shell member 2, and the other shell member 1 is formed with a flange 16 which laps over onto the inner flange 15, so as to make a fairly close joint between the shell members. When these two shell members are entirely closed these flanges 15—16 are entirely concealed within the shell leaving a perfectly smooth exterior and without any rib on the outside.

In the drawings there is shown the stem 18 of a tire valve projecting through a wheel felly 191. The shell members and sleeve are assembled by slipping the sleeve over the open ends of the shell members before being connected with the valve stem, as shown in Fig. 5. In putting the dust cap on the valve stem the sleeve portion is slipped onto the outer end of the valve stem and the cap is pushed in by a straight push until the tapped out shell members engage with the threaded portion of the valve stem. The inner end of the sleeve 8 will be seated on the wheel rim before the threaded portion of the cap begins to engage the threaded portion of the valve stem. The combined shell members are capable of being somewhat further pushed in after the sleeve comes onto its seat by reason of the annular groove 25 which allows a longitudinal play of the said shell members with relation to the sleeve. During this additional forward thrust of the shell members the tapered interior of the sleeve will engage the tapered exterior of the shell members and force them into closed position by the time the threaded portion of the shell members begins to engage the threaded portion of the stem. It then requires a very slight turning of the cap to make a sufficiently firm engagement of the cap with the stem of the valve.

Preferably each shell member is formed with a wing 19 to afford a finger grip for rotating the cap.

When it is desired to remove the cap it requires but a slight reverse turning of the cap to disengage the threaded members, then it may be pulled outward with relation to the sleeve until the lips 10—10 engage with the shoulder 13 and the spring 12 will spread the shell members apart sufficiently so that the cap may be lifted from the stem.

What I claim is:—

1. A dust cap for valve stems comprising two semi-cylindrical shell members pivotally connected together at their outer ends and being adapted to be brought together to form a cylinder, said shell members being tapered forwardly on their exterior periphery at their base ends and being also tapped out on the inner periphery of said tapered portions, in combination with a separable sleeve member which is tapered on its inner periphery to fit loosely over the tapered exterior of the two shell members, said sleeve member being formed at its base ends with an interior annular groove, said shell members being formed with lateral projections which are adapted to engage in said groove when the members are assembled, and a spring connected with the interior of one of said shell members and having a free portion which engages the interior of the other of said shell members, normally spreading the two shell members slightly apart when the dust cap is detached from the valve stem, the two shell members being closed and the spring compressed by the action of the tapered sleeve when the cap is screwed onto a valve stem.

2. A dust cap for valve stem comprising two semi-cylindrical shell members pivotally connected together at their outer ends and being adapted to be brought together to form a cylinder, said shell members being tapered forwardly on their exterior periphery at their base ends and being also tapped out on the inner periphery of said tapered portions, in combination with a separable sleeve member which is tapered on its inner periphery to fit loosely over the tapered exterior of the two shell members, said sleeve member being formed at its base end with an interior annular groove, said shell members being formed with lateral projections which are adapted to engage in said groove when the members are assembled, the two shell members being closed by the action of the tapered sleeve when the cap is screwed onto a valve stem.

In testimony whereof I affix my signature.

FRANK LEMING.